US008146192B2

(12) United States Patent
McGlynn (10) Patent No.: US 8,146,192 B2
(45) Date of Patent: Apr. 3, 2012

(54) EMERGENCY SELF EVACUATION SYSTEM

(75) Inventor: Douglas McGlynn, Royal Palm Beach, FL (US)

(73) Assignee: Douglas McGlynn, Royal Palm Beach, FL (US)

( * ) Notice: Subject to any disclaimer, the term of this patent is extended or adjusted under 35 U.S.C. 154(b) by 481 days.

(21) Appl. No.: 12/456,146

(22) Filed: Jun. 12, 2009

(65) Prior Publication Data

US 2010/0317247 A1  Dec. 16, 2010

(51) Int. Cl.
*B25F 1/00* (2006.01)
(52) U.S. Cl. ............................................. 7/158; 224/162
(58) Field of Classification Search .............. 7/158, 170; 224/162; 242/386, 403
See application file for complete search history.

(56) References Cited

U.S. PATENT DOCUMENTS

| 2,982,392 | A  | * | 5/1961  | Bossone ........................ 224/400 |
| 3,504,787 | A  | * | 4/1970  | Brockway ..................... 206/570 |
| 4,927,354 | A  | * | 5/1990  | Sanford ........................ 431/253 |
| 6,257,469 | B1 | * | 7/2001  | Cohn ............................ 224/162 |
| 6,382,481 | B1 | * | 5/2002  | McIlmoil ...................... 224/162 |
| 6,418,628 | B1 | * | 7/2002  | Steingass ........................ 30/367 |
| 6,551,159 | B1 | * | 4/2003  | Spinelli et al. ................. 441/80 |
| 7,028,874 | B2 | * | 4/2006  | Lin ................................ 225/93 |
| 7,051,391 | B2 | * | 5/2006  | Wang ................................ 7/158 |
| 7,557,720 | B2 | * | 7/2009  | Rubin et al. ................. 340/574 |
| 2006/0054729 | A1 | * | 3/2006  | Salentine et al. ............ 242/379 |
| 2006/0058081 | A1 | * | 3/2006  | Reichenbach ............. 455/575.8 |
| 2006/0068944 | A1 | * | 3/2006  | Sandberg ..................... 473/408 |
| 2006/0270290 | A1 | * | 11/2006 | Tellew ........................... 441/88 |
| 2007/0182572 | A1 | * | 8/2007  | Rubin et al. ................. 340/574 |
| 2008/0265082 | A1 | * | 10/2008 | Angiuli ........................ 242/400 |

* cited by examiner

*Primary Examiner* — David B Thomas (57) ABSTRACT

The instant invention covers all areas of transportation emergency situation egress. Primarily intended for user self-evacuation from an enclosed space that has become Immediately Dangerous to Life and Health (IDLH) a version is specifically designed for use by First Responders for exterior rescue.

24 Claims, 7 Drawing Sheets

EMERGENCY SELF EVACUATION SYSTEM

FIELD OF THE INVENTION

The instant invention relates to automotive rescue tools and more particularly to a pre-planned, organized life-safety system for self-removal of occupants from within the confines of a vehicle when the occupant space is deemed, or expected to become Immediately Dangerous to Life and Health (IDLH).

BACKGROUND OF THE INVENTION

There are numerous rescue tools presently in existence.

U.S. Pat. No. 6,551,159 to Spinelli covers the shortcomings of many examples of the prior art very well. These examples are incorporated herein by reference to Spinelli. However, Spinelli's own shortcomings exist primarily in the fact that Spare Air™ and their like containers of compressed air are very solid in order to actively contain the compression of the air inside. These solid and heavy objects in a violent collision can fly around the passenger compartment, striking occupants on the head as well as causing immobility and injury to the user's hands & fingers. Spinelli's system heightens the danger to the situation and ironically leaves the user in greater harms way than originally presented with.

Spinelli is a self-evacuation tool focusing on compressed air breathing apparatus. Although Spinelli does have peripheral window breaking and seatbelt cutting tool, its main focus is on underwater breathing and not the multi-task-oriented self-evacuation of occupants in all automotive emergencies. It and prior art fail to address the usability of said devices with automotive emergencies involving collision induced entrapment of occupants under heat, smoke, and toxic gas environments in addition to underwater incidents.

Obstruction of the primary path of egress, the low visibility environment, the buoyancy of rescue equipment as well as precautions taken for anti-slip hand surfaces and waterproof capabilities have all been recklessly ignored in prior art. This is unacceptable and is caused partly because the safety standards of other mandated fields pertaining to the preservation and salvation of human life are not applied to automotive emergencies. We intend to change that, through safely and effectively providing a comprehensive Emergency Self-Evacuation System with the tools to do the job that is designed to meet the demands of an atmosphere that is classified as the "intended target incident of use".

It and the prior art further completely miss the fact that lights should be waterproof. A vehicle sinking in a canal, river or the like must have waterproof illumination so to allow occupants to see the provided rescue tools and then use them. Prior art may have installed a light on said devices, however, if you can't count on that light to work while the environment is submerged underwater then the product is dangerously faulty since the implied feature of a light leaves the user with a false sense of assurance that the device will be effective in such incidents. Unlike prior art, the instant invention also has reflective, fluorescent and buoyancy properties added to the tool and emergency cord. Most vehicles involved in collision, rollover, fire, airbag deployment, and/or entrance into below grade bodies of water such as canals, lakes, and ponds will involve a mixture of motor vehicle hazards including but not limited to toxic fumes, airborne powder particulate, fluids, oils, and properties that make the environment extremely dangerous to the occupant. In addition to these qualities of environment expected to exist in the "intended target incident of use" for such instant invention, the surfaces will be non-conducive to enhanced dexterity at pin point accuracy. This leaves a good chance of dropping prior art tools into said environment causing the users' availability to use it to be lost.

Contrarily to the prior art, the instant invention is a complete system for self-evacuation utilizing a rescue tool in a pre-plan for an organized and systematic removal of occupants within the confines of an automobile.

Going beyond the faulty effectiveness of the prior art, the instant invention improves upon existing and current art designs that merely cut seatbelts and break glass with a flashlight thrown in as an afterthought. Instant invention 10 provides a complete system that incorporates the life safety code of American safety standards into an evacuation system designed for entrapped occupants within an automobile during an automotive emergency.

It is an object of the instant invention to add several novel changes to the typical prior art rescue tool.

BRIEF DESCRIPTION OF THE DRAWING

Many aspects of the present disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The several figures of the drawing, in which like designations denote like elements, are representative only and do not appear as limiting in any way.

FIG. 6. is a left sided dorsal cutaway of Emergency Rescue Tool with exploded Airbag Pierce/Puncture components FIG. 7. is an anterior cutaway of Emergency Rescue Tool fork 24 with explosive view detail on Rigid Plastic Blade Arm 84 and Interlocking T-bar 86

DESCRIPTION OF THE PREFERRED EMBODIMENT

Figures 1, 4, 5:
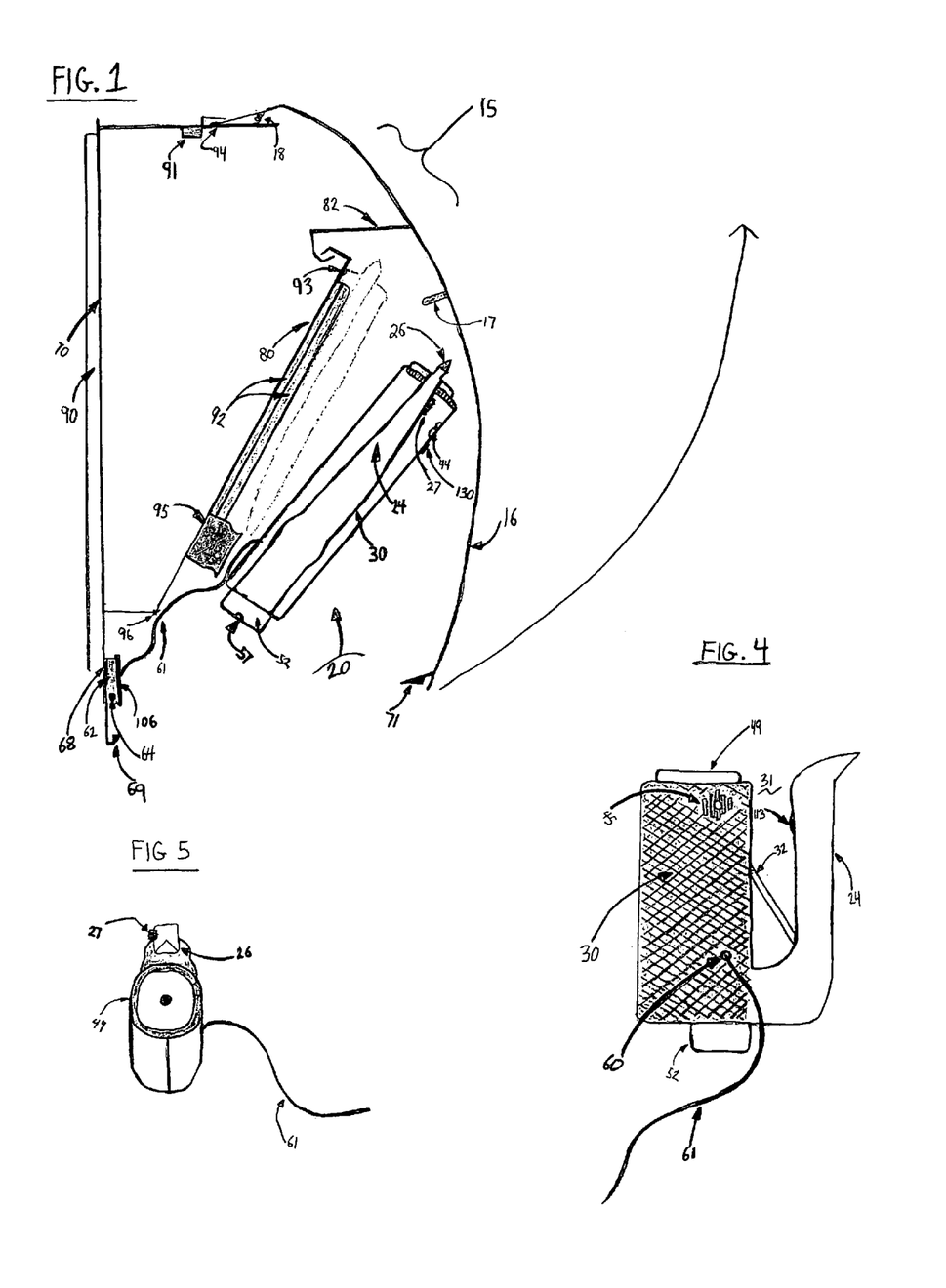
FIG. 1 is a cutaway of the instant Emergency Self-Evacuation System with two-part Tray/Door System in Safety Storage Cabinet.
FIG. 4 is a posterior view of Emergency Rescue Tool in upright position
FIG. 5. Is a top View of Emergency Rescue Tool
Figure 2:
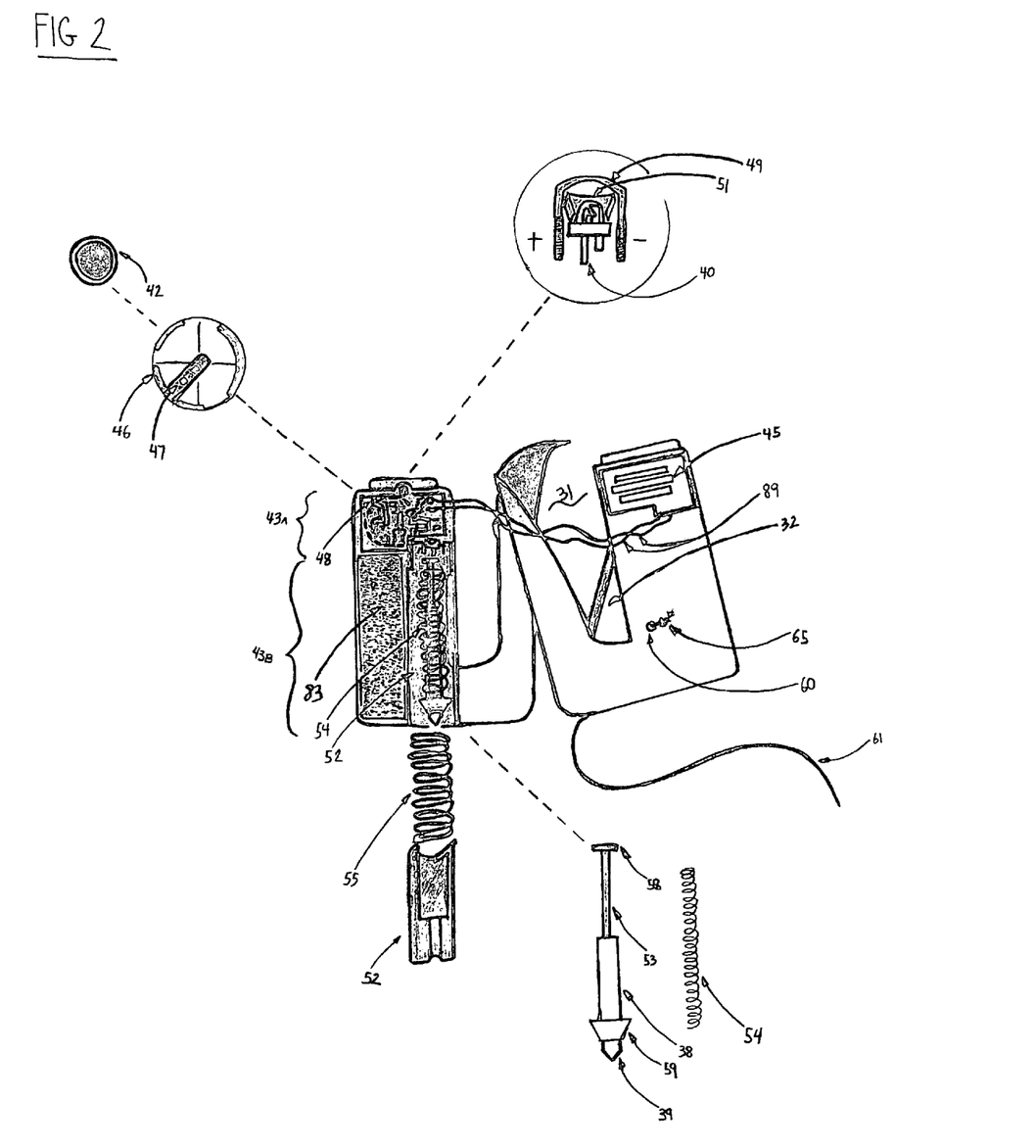
FIG. 2 is a peel-away of the Emergency Rescue Tool showing its internal features in explosive detail view
Figure 8:
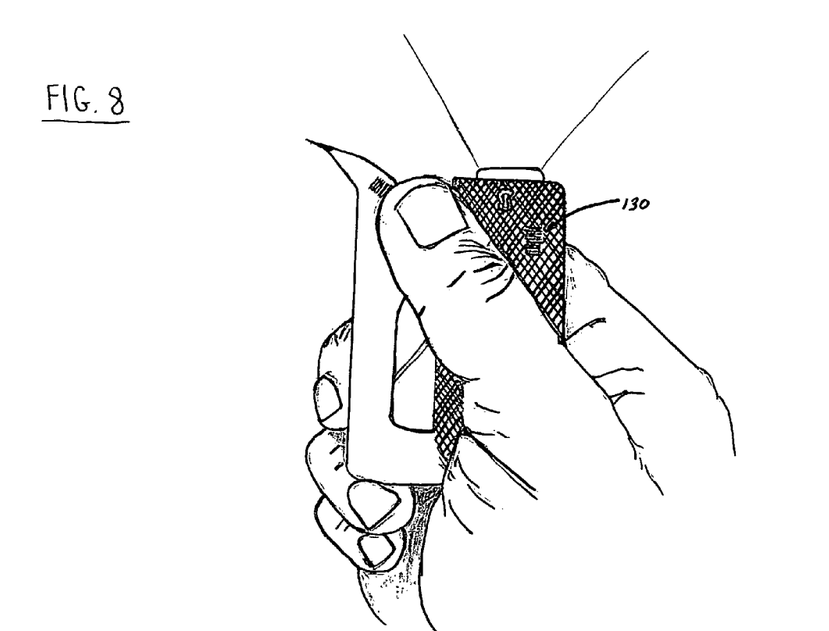
FIG. 8. is an anterior view of Emergency Rescue Tool displaying method of operation (ie; light illumination), thumb on Slide Grip Switch 27
Figure 9:
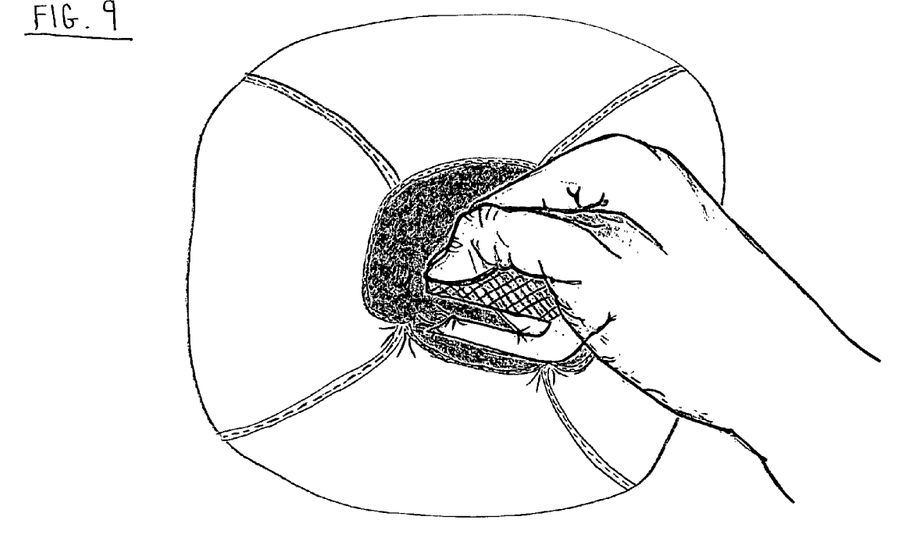
FIG. 9. anterior view of Emergency Rescue Tool displaying method of operation against an inflated airbag with material introduced into Airbag Cutter Channel 31
Figures 10, 11:
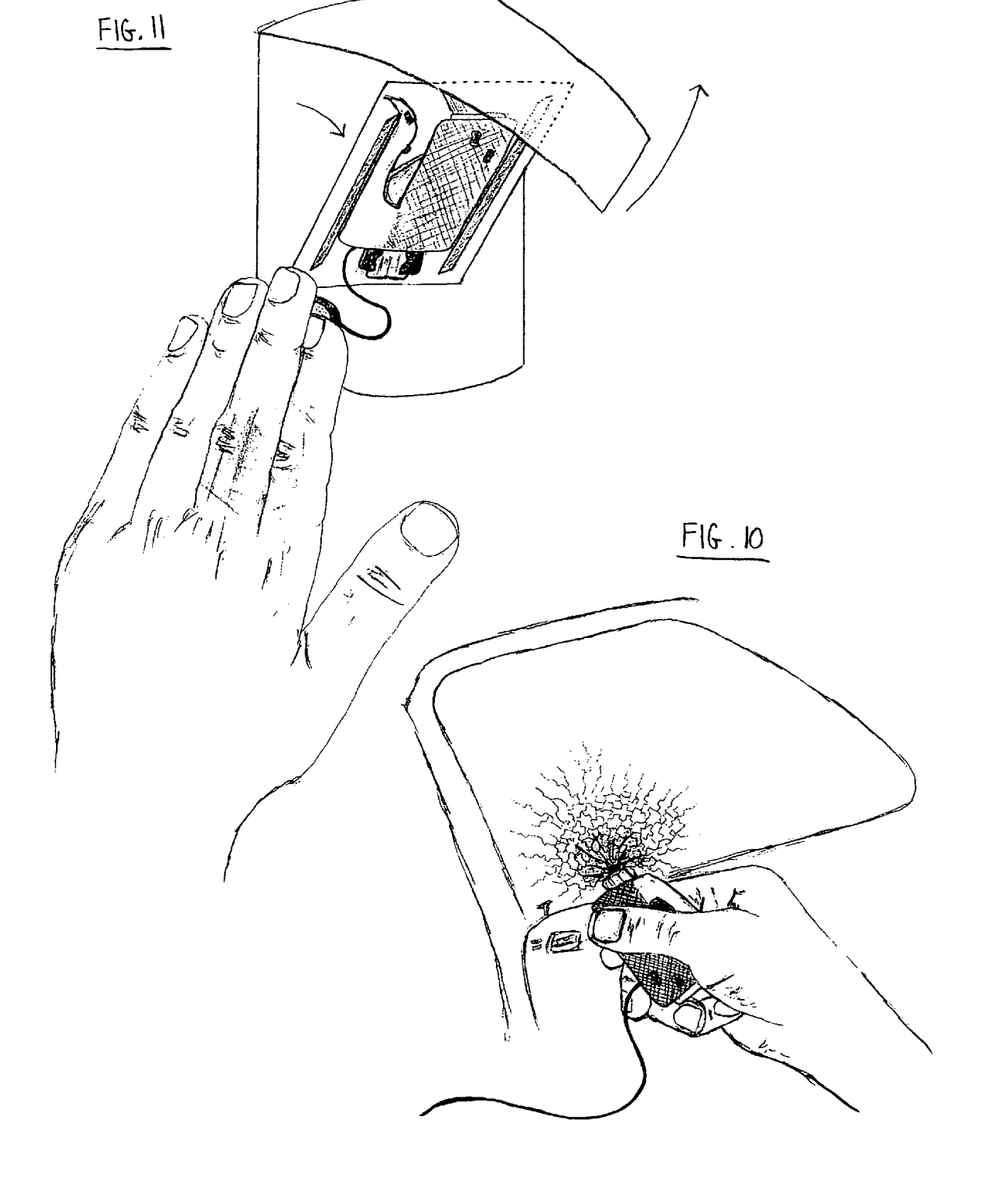
FIG. 10. is anterior view of Emergency Rescue Tool with Inferior side up displaying method of operation (ie; user breaking automotive glass with glass breaking component 50)
FIG. 11. is a perspective view of a user hand reaching inside open compartment housing displaying method of operation post "one touch" activation of door FIG. 12. is a posterior view of $1^{st}$ Responder Model 200 presenting emergency cord reel housing 62 with emergency cord housing clip 107 displayed FIG. 13. is view of $1^{st}$ Responder Model 200 clipped onto the front bunker coat of a fire fighter's turnout gear. Also emergency cord 61 is extending into firefighter's hand where tool 20 exists with light 40 shining

Turning to FIG. 1, the entire emergency self evacuation system 10 is shown. The instant emergency rescue tool 20 is shown as removably insertable into Interior Tool Storage and Support Tray 80 that is swingably mounted within its safety storage cabinet 22. FIG. 2 shows the emergency rescue tool 20. Emergency rescue tool 20 handle 30 is forked providing channel opening 31 to channel material to be cut towards blade 32. The material to be cut would comprise seat belts, airbag suspension straps and textile airbag material itself. The latter is especially prevalent on side impact/roof rail airbags. Styles known as air curtain airbag have roof rail mounted suspension straps maintaining a roof rail side impact airbag in the upper portions of the passenger side window position post deployment. These are the types used for side impact airbags that although contribute to countless lives saved every year at time of side impact and/or rollover collision commonly obstruct the occupants' primary path of egress in the "post collision/post impact" phase of the incident, i.e.: obstruction of vehicle side window. By placing cutter blade 32 within the interior of channel 31, instant tool 20 has a wider fork 24 that prevents a user from cutting him or her self while using tool 20 to cut materials. See FIG. 5 as well as FIGS. 8-10 for operational methods of use. Blade 32 further facilitates the cutting of textile airbag material for purposes of rapid evacuation of airbag gasses from the deployed state of above mentioned airbags. As stated earlier, although Safety Restraint System Airbags afford incredible safety standards to the occupant at time of impact it is the post-collision airbag in it's fully deployed state of inflation that poses a life safety hazard to occupants in the way that it obstructs the primary path of egress.

Figures 6, 7:
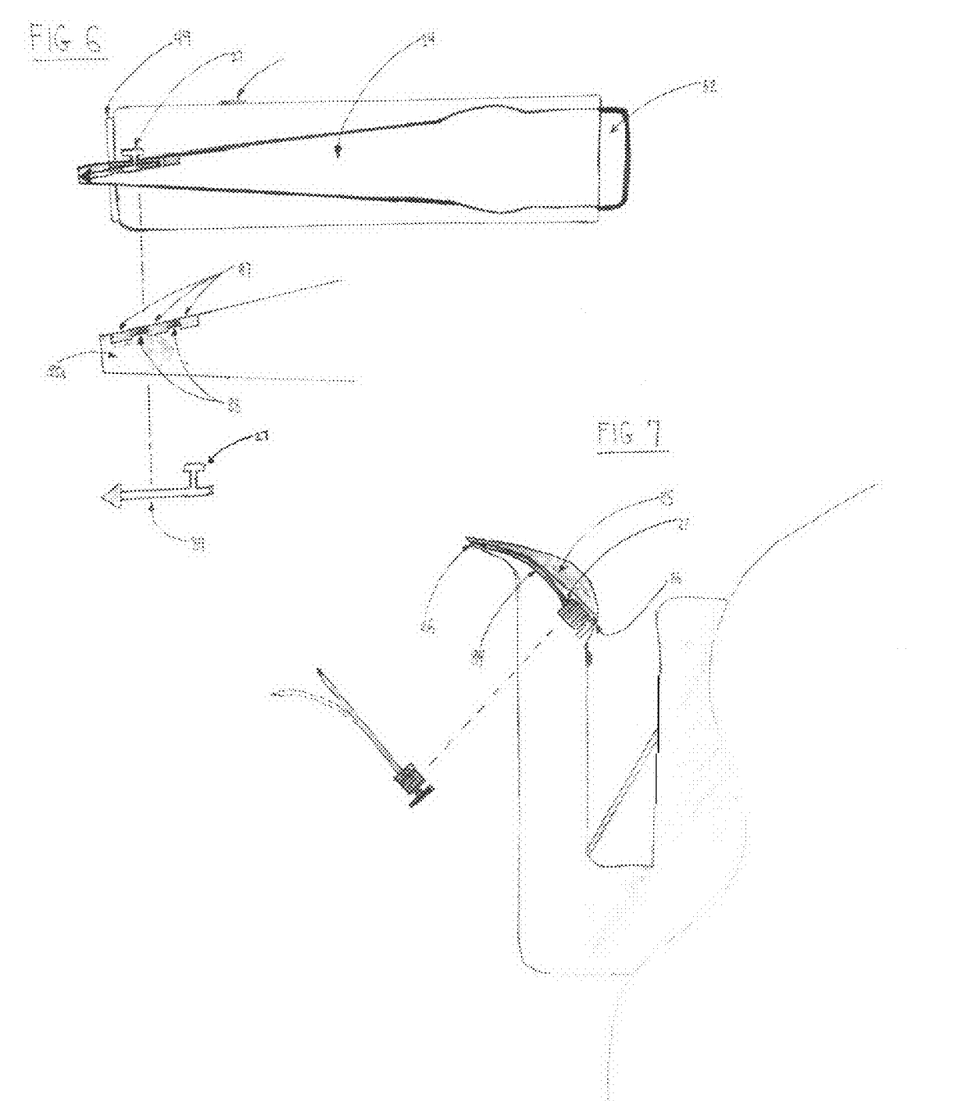

Thus Retractable Tip Blade 26 which forms triangular tip sides extending from outward deflecting flange of Prong/Fork 24 by means of fixed attachment to interior component within via Rigid Plastic Blade Arm 84 (FIG. 7) and Interlocking T-bar 86 that allows a compression resistant slide switch 27 to be moved outward and retracted with one finger of the dominant hand, preferably the thumb. Blade arm 84 rests vertically on a tilted axis within the distal interior of prong/fork 24 where the dorsal portion of this distal interior creates the channel from which blade arm 84 travels from the extended to retracted position. The superior part of the distal end of prong/fork 24 has a wider surface area on the exterior which is offset on the interior with a filled in area 85 that also serves as a blade arm 84 straightening feature that exists just superior to blade arm 84, further facilitating the top portion of this channel from which blade arm 84 stands the chance of pressing against. Blade arm 84 remains within the channel of distal Prong/Fork 24 by means of recessed blade arm track 88 and locking blocks 87. It is used to puncture the inflated airbag material. Blade arm T-bar 86 allows the blade to remain fixed until compression is exerted on slide grip switch 27 freeing it from the proximal locking block 87, further allowing it to slide along the arm track 88 until blade arm T-bar 86 meets the distal locking block 87 resulting in the outward projection of blade 26 from the distal end of prong/fork 24 and locking in blade arm 84 into the lock block position. In doing so, this projected blade tip 26 allows the piercing of airbag material by creating the needed purchase point to further allow Prong/Fork 24 to enter the airbag interior itself, to deliver the material of the punctured airbag into the Airbag/Seatbelt Cutter Channel 31, therefore allowing blade 32 to cut the material. In doing so, a larger opening to the airbag exterior is created in rapid succession in one swift movement allowing the rapid evacuation of airbag gasses resulting in reduction of the airbag size, further resulting in the clearing of obstruction to the primary path of egress to fleeing occupants attempting to emergency self-evacuate. Maintaining this "open corridor" or "path of primary egress" in any emergency that confines occupants to interior spaces is paramount in the fundamental design of Life Safety Standards for building occupancy, however, it does not exist in automotive occupancy. The instant invention does provide such enhancement to the Life Safety Standard of Human Occupancy within the confines of automotive interiors.

History of Life Safety Codes have been written into law restricting structure builders to design such features that require and mandate open corridors of egress based on the quantity of lives potentially saved during emergencies of fire, collapse, and or entrapment within building occupancies; however, automotive occupancy has no such consideration based on the low quantity of life in such interior. The instant invention redirects the focus of Life Safety Standards from quantity of lives potentially saved to "quality" of lives saved with the minimum standard of "1" in effect. Thus, the element and design of the instant invention of Emergency Self-Evacuation System is built on the premise that even "one life" saved is worthy of incorporating such added enhancements and features to the life safety standards of occupants traveling or taking up occupancy within automotive interiors.

In order to facilitate ease of use by most hands of certainly differing sizes, the following dimensions are preferred. Tool 20 is preferably ½ inch in thickness where grasped. Opening 31 is preferably some 3 and ½ inches from the outer end to its ending in the middle of tool 20. Blade 32 lays preferably ¾ inches maximum exposure from the interior end of channel 31.

In a car fire, the passenger compartment can get filled with smoke while the seat belt latch can become too hot to touch. Should a car go into a body of water, river or canal, debris can make the seat belt latch inoperable. Thus, tool 20 has blade 32 in channel 31 to cut seat belts and air bag hanger straps so occupants have a second method of freeing themselves from their restraints so to exit the vehicle.

Further, smoke and water can fill the vehicle. To handle this emergency, light 40 is provided. Light 40 is preferably a light emitting diode, LED, as this type produces vivid illumination with little power needs and can last for the lifetime of an owner or user. Light 40 is enclosed in the watertight compartment of Shaft 43a of Tool Body 30 on its proximal end and by Waterproof Lens Cap 49 on the distal end. Light 40 shall preferably feature parabolic reflector 51 so to intensify and enhance the candlepower generated.

An electric source, such as battery 42, preferably lithium anode and round in diameter measuring within mm's of clearance from the top of interior tool shaft 43a will rest on battery electric contact 47 further delivering energy to electric power circuit board 48 just beneath where battery compartment plate 46 will hold battery 42 in place. Electric wire 37 will transmit stored energy from battery 42 and deliver it from source and/or circuit board 48 to audible activation chime 45. Circuit board 48 shall preferably make electric connection directly to led light 40 and shall preferably remain with waterproof shaft 43a of tool body 30 including Universal on/off switch 44 which further features a rubberized glove on the tool body 30 exterior maintaining a water proof seal to the electric components of the interior. Universal on/off switch 44 is provided to maintain battery 42/light 40/Audible Activation Chime 45 connection in the "off" position and in waiting condition so long as tool 20 is within system 10 housing 15, and so long as prong 17 located on the interior of housing 15 door 16 presses inward upon switch 44. This shall be the preferred stow-away state during tool storage where light 40/Audible Activation Chime 45 stays off. The inside face of Audible Activation Chime 45 shall preferably complete the waterproof seal to compartment 43a while the outside face shall preferably be open to the exterior slots in tool handle 30 to allow sound to transmit from the speaker while at the same time not allowing water to enter the waterproof compartment 43a from this exterior surface.

Door 16 is hinged so that a downward compressive force or push from a user's hand unlatches the bottom locking clip 71 on door 16 allowing it to swing up and outward via the release of stored tension that is created from the compressed spring 18. In swinging upward, prong 17 releases switch 44 by backing away and upward along with the movement of door 16. In this action prong 17 releases switch 44, light 40 turns on automatically while also activating the Audible Activation Chime 45 and stays on until switch 44 is again depressed. Switch 44 can be depressed manually by a user when tool 20 is outside system 10 housing 15. This action would solely be for test purposes. Switch 44 automatically turns off when tool 20 is placed into housing 15 and housing door 16 is closed. This action stores tool 20 inside housing 15. Tool 20 is now waiting with its light 40 and Audible Activation Chime 45 off in ready condition to help a user when needed.

Opposite in placement on tool 20 is glass breaking component 50. Glass breaking component 50 comprises a tubular shaft 51, a preferably carbon steel pin 53 that is recessed beneath preferably cylindrical housing 52 and a two-part retro-responsive spring system 54 & 55. Opening 57 located centrally in housing 52 allows pin 53 to thrust forward under impetus from spring 54, with pin 53 at the distal end featuring a greater diameter, shank 38 working in conjunction with larger spring 55 to allow glass breaking tip 39 to project outward from within housing 52. Shank 38 at the distal end rests a plunger like rubber stop 59 that does not allow forward forces of pin 53 to clear the opening 57 through housing 52. Stopper 59 is contoured to a degree that allows Glass Breaking Tip 39 to project outward clearing the housing 52 via opening 57 for just a moment before spring 54 applies tension on pin 53 in conjunction with the tension applied to shank 38 via spring 55. Pin 53 also has head 58 at the proximal end that sits in a particular seat within the proximal portions of tubular shaft 51 that maintains head 58 in a static position.

Just inferior to glass breaking component 50 and located dorsally to it on tool 20 is cord attachment 60. Cord attachment 60 holds cord 61 which itself attaches to a reel system 62. Cord 61 is preferably three feet long and is preferably comprised of Nylon-Kevlar composite; however, polypropylene properties may also exist in the construction of said Emergency Cord 61 in order to achieve desired buoyancy during "intended target incident of usage". Cord 61 shall also preferably possess neon-fluorescent color properties that not only provide a bright glow but should reflect ambient light that the Emergency Rescue Tool itself generates from Light 40 even in low visibility/low light environments.

Stopper knot 65 secures distal end of cord 61 to the inside of cord attachment 60 on body of Tool 20. Reel system 62 allows cord 61 to extend out and away from housing 15 at Reel System 62 by means of Reel Housing Opening 101 as Tool 20 is removed from Tool Storage & Support Tray 80 by the user. Reel System 62 has no self-retracting mechanism and instead has a manual cord retrieval push button 64 further allowing cord 61 to be rewound upon provided spool 66 located within reel system 62. Self-locking mechanism 67 within Reel System 62 prevents self-recoiling of cord 61 unless button 64 is manually depressed by a user. Cord 61 is attached to Spool 66 by means of Spool Stopper Knot 102 at the medial end.

The dorsal surface of Reel system 62 has permanent mounting 68, preferably tape from 3M™ Model #______ attached to lower anterior of housing 15. The anterior Reel Housing 62 has permanently mounted Cutter/Channel Block 106 in the vertical position in both models. Cutter/Channel Block 106 serves no other purpose than to receive blade 32 of tool 20 in the 1$^{st}$ Responder mode of operation (see Appendix A). Further described in appendix A, the 1$^{st}$ Responder Model 200 features multi-positional compression clip 107 in substitution to the standard model mounting tape 68 (preferably 3M™ Model #______).

Figure 3:
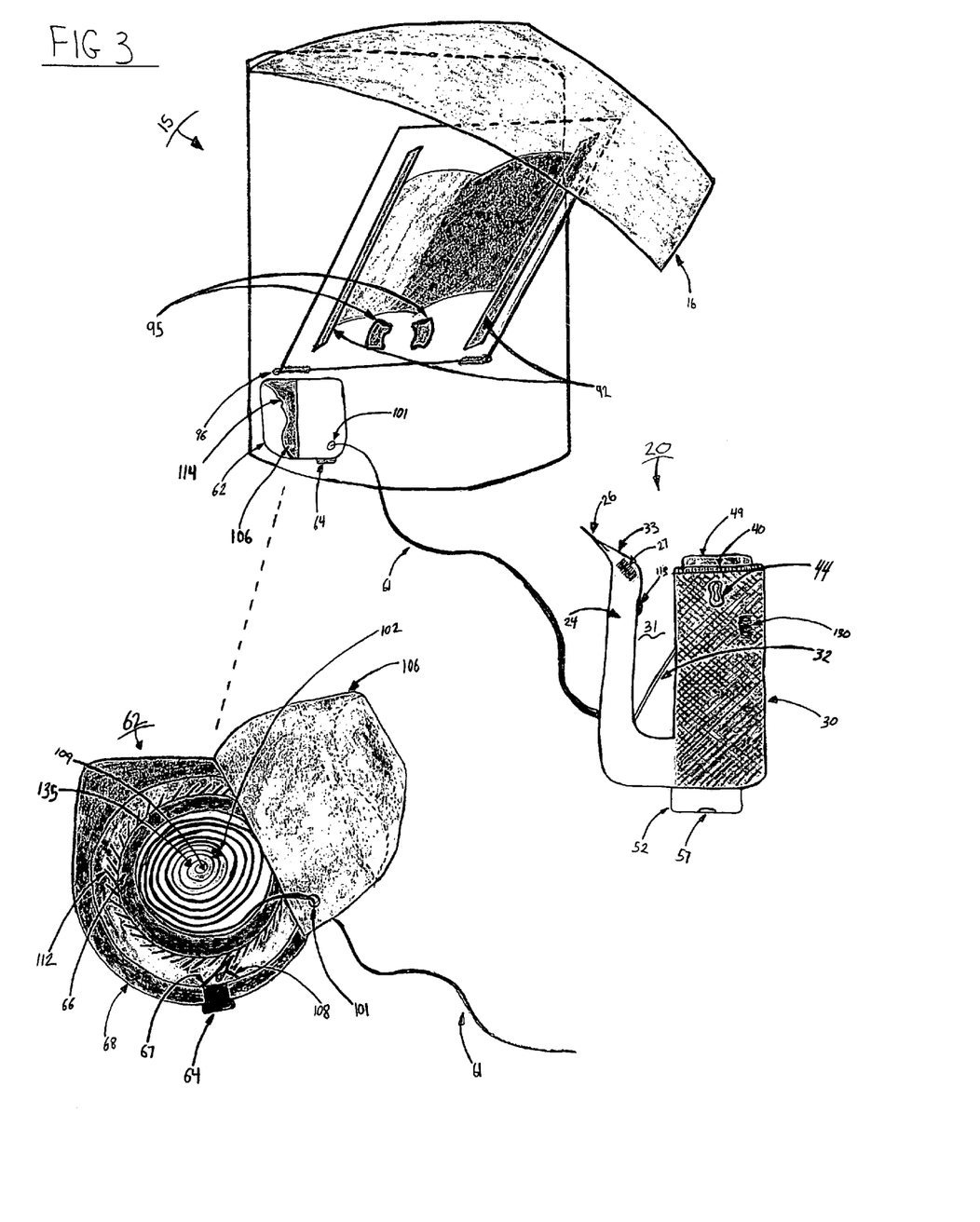
FIG. 3 is an anterior view of the Emergency Rescue Tool Safety Storage Cabinet in a frontal-offset with additional explosive view of Emergency Cord & Reel System.

Tool 20 has Interior Tool Storage and Support Tray 80 to sit upon while enclosed in housing 15. As housing 15 door 16 opens, tool 20 becomes available for grasping by a user as the Storage & Support Tray 80 drops down into range of reach by means of Interior tray bottom hinge 96. Tray 80 on the toolside of the interior has a pair of fixed, side-track tool stabilizer rails 92 that allows Emergency Rescue Tool 20 to sit snug between them on the lateral and/or dorsal ends. A recessed surface beneath where tool 20 is projected to be positioned within and upon tray 80 facilitates the "seat" for which tool body/handle 30 preferably rests while an elevated plain to the left allows Prong/Fork 24 to rest on an even plane with the rest of tool 20. Below this custom seat between the side-track tool stabilizer rails 92 exists a C-clamp style attachment (FIG. 3) serving as Glass Punch Compression Bracket 95 for which the tool 20 remains in place against Tray 80. Glass Punch Compression Bracket 95 holds Tool 20 in place against seat of Tray 80 and stabilizer rails 92 while also allowing tool 20 to swing outward (dotted lines shown on FIG. 1) making it practical and easy for a user to grasp it without additional steps to un-attach it or unlock it first A manual inward compressive force upon the anterior aspect of outer door 16 activates spring 18 to allow door 16 to swing up and outward on hinge 94 via pressure from spring 18.

Optionally, a switch 91 serving as a sensor/relay activated by door 16 in an upward movement activates an automatic electronic emergency call to an emergency dispatch center. Such an emergency dispatch center could be the one presently called OnStar™. Thus the typical OnStar™ installation kit (not shown) could be adapted for use in the instant emergency system 10 and could involve but not be subject to limitation as to include a wiring installation kit, additional sensor/relay switch and additional connectors that would allow official communications to be established between instant invention and OnStar™.

Mounting tape 90 is provided on back of housing 15 so to permanently and preferably irremovably mount system 10, housing 15 to an automobile interior surface, preferably the interior pillar of the vehicle, closest to the intended occupant seating position wishing to provide such said protection with instant system 10. Mounting tape 90 is preferably 3M™ Model #______. This is because mounting and operation of emergency self-evacuation system 10 is not specific to the driver seat position of the automobile. If only one emergency self-evacuation system 10 existed per vehicle then any time spent on sharing the rescue tool 20 with other occupants will in fact delay those persons from activating the system 10 and begin the process to free oneself and initiate the steps to self-evacuate. With the intent to preferably provide each seated position of the vehicle the same level of life safety while traveling in the automobile, securely mounted instant system 10 is designed to be positioned at the closest interior location to any and every potentially seated occupant of the vehicle interior. Ideal locations include the "B" Post/Pillars (vehicle pillar separating front seat car doors from rear seat car doors and/or rear windows in cases of 2 door coupes). Additional mounting locations could include but not be subject to limitation shall be within the "C" Post Pillar location of the interior as often seen preferable for rear seated passengers. "D" Post Pillars may include modern day SUV's where children will be subject to fend for themselves in the distant portions of the vehicles interior (i.e.; rows of bench style seating in vans, SUVs' and mini-crossovers). It is the intent of this design of said instant invention comprising of emergency self-evacuation system 10 that children mature enough to practice fire exit drills in the home or at school shall be the minimum age of such intended user if such user has a potential to occupy a seated position within a motor vehicle. Mounting tape 90 is preferably water resistant, humidity resistant and constructed of commercial grade quality materials suitable for any automotive exterior as well as interior. A preferred manufacturer for tape 90 would be 3M™.

The instant emergency self-evacuation system 10 additionally relies on utilization of self-evacuation via known "muscle-mental memory model." Reaching for the seatbelt buckle behind and/or adjacent to oneself is an automatic muscle-memory activity. Thus, the instant system 10 is mounted via tape 90 preferably on an interior pillar of a vehicle where the seat belt buckle is normally positioned and/or originates from. Hence, in a subconscious act of intention to produce "safety," a user in an emergency will automatically reach for the instant system 10 when it is mounted near the normal position of the seat belt buckle in the same fashion as an occupant reaches for their seatbelt. By extending their routine-oriented and/or dominant arm in an almost autonomic act of reaching for the seatbelt buckle, the user subconsciously practices muscle-mental memory action. Additional rationale of preferred placement of instant invention is partly due to statistical data on most vehicle collisions resulting in interior intrusion or deformity whereas those fixed interior components such as the center console compress against the vehicle seatbelt latch causing the occupant entrapment by means of seatbelt restraint therefore warranting the accessibility of a seatbelt cutting device. In such a situation the occupant will commonly reach for the top of the seatbelt harness in a desperate attempt to free themselves or in this case activate the emergency self-evacuation system in one sweeping, subconscious movement that is tapping into the "muscle-mental memory models" of prior and similar action. This subconscious action of self-preservation by reaching for the seatbelt buckle and pressing door 16 on housing 15 of system 10 is a preferably integral part of the instant system 10 and the Muscle-Mental Memory Models have been designed into the technology of such.

Thus, positioning of housing 15 to properly place housing 15 for muscle-mental memory self-preservation by a user is a highly preferred and highly important part of the instant system 10.

As can be comprehended, instant system 10 involves a one-step method of activation of said system 10 when a user instinctively reaches for the seatbelt buckle and activates door 16.

Upon activation of door 16, switch 91 preferably calls OnStar™ as door 16 swings upward allowing hook 82 to pull tray 80 downward and tool 20 outward, activating audible chime 45 while also turning light 40 on permanently.

This instant system 10 can be activated into full operability by just one instinctive maneuver of a user.

The one-move methodology of instant system 10 allows tool storage & support tray 80 to drop down and deliver a shining, lighted tool 20 ready for use without obstruction in an environment generally known to the rescue art as IDLH, Immediately Dangerous to Life and Health.

In any case that the instant system 10 is inadvertently activated by an occupant adjacent or in the seating position where said emergency self-evacuation system exists and/or is mounted, an audible activation chime 45 will beep intermittently once every 2 seconds. This intermittent beep not only warns occupants that the emergency-self evacuation system was activated but contributes to the soothing tempo of a coordinated plan of egress compared to some of the prior art alarms that tend to add intensity to an already emotionally charged event. In the event of false activation or unintentional activation the audible chime 45 can deliver the notification to other occupants without causing the reactive shock that shrieking alarms can sometimes create inside motor vehicles. Since the activation chime 45 is activated when door 16 releases interior prong 17 from Universal switch 44 and not when Tool 20 is actually removed from Tray 80 and compression bracket 95, the system 10 can be placed back into full ready mode by simply closing the outer door 16 so that locking clip 71 is again secured to receiving latch 69. This adds additional comfort and safety for those drivers and adults who may be installing said instant system 10 adjacent to juvenile seating positions within the vehicle. The opening of such storage housing 15 exposing the interior tray 80 within reach of such juveniles would be detected long before tool 20 could be within the grasp of such youth.

For added protection and child safety measures a compressive slide switch 27 was added to expose the airbag pierce/puncture blade 26 on Fork 24. An added protection in regards to unintentional injury to user when handling Tool 20 exists in the widened Fork/Prong 24 at the proximal end to prevent inadvertent exposure to blade 32.

System 10 allows a user to perform all rescue operations with only one hand. Thus, whether the IDLH is completely wet submergence, smoke-filled, heat intensified, within zero visibility environment, or any other, instant system 10 will deliver a usable tool 20 into one hand that can accomplish all rescue operations with the same single hand.

Cord 61 will allow a user to retrieve tool 20 should the user drop tool 20 while deployed in an IDLH environment. A user, by simply again reaching for the muscle-memory "seatbelt", can regain cord 61 and follow it to tool 20.

The user would use tool 20 to cut the seatbelt and side airbag curtain hanger and or suspension/support straps, turn his or her hand via articulating user's wrist and punch out the window glass using punch 50. Because there is no automatic retrieval tension on the emergency cord 61 of tool 20, a user can always find it, and use it without it pulling out of the user's hand. Without the non-retractable feature on cord 61, instant system 20 would not be anywhere near as safe as it is since it reduces the consequence of continuous oppositional tension on the tool while a user is attempting to self-evacuate.

In addition to several of the enhancements and new art presented with instant system 10, a section of high-to-moderate density foam or polystyrene material is preferably packed into the section of tool body/handle 30 within the non-waterproof compartment 43b. This addition creates the needed buoyancy to tool 20 so that it serves the user while in the ITIU or "intended target incident of use", earlier mentioned, to describe the potentially wet, dark, slippery, superheated, emotionally and physically charged environment associated with occupant entrapment post vehicular collision.

Because the emergency self-evacuation system is an integrated emergency exit plan coupled with the life saving technologies demanded of modern state emergencies the system would not be complete without a back up plan. An anti-slippage surface has been added to the exterior of tool body/handle 30 that consists of a cross hatched scoring into the outer embodiment of tool body 30 for an enhanced grip that the user can truly count on. This anti-slippage surfacing reduces the chance of the user dropping tool 20 while in use. If the user does drop tool 20 out of hand it will not be pulled back into the retracted position within system housing 15. In fact it will continue to shine, beep, reflect light and float right in front of the user in the area where tool 20 was originally dropped. In the event that a back-up plan or a Plan "B" is not effective even with so many provisions in place to ensure rapid retrieval of such tool 20 in cases where the user has dropped it, an additional back-up plan or Plan "C" will serve as an added contingency. This will always be in effect since it serves as the ultimate LifeLine™ which comprises the floatable, reflective, heat resistant emergency rescue cord 61 that a user can grasp at the point of origin in order to slide the dominant or working hand upon it. This maneuver allows the user to slide their hand along the line much like a guide wire until the distal end of the 3 ft emergency cord 61 is met, producing tool 20 into the hand of a fleeing occupant attempting to evacuate via a self-rescue. The instant system 10 comprises an "all bases covered" approach to developing a comprehensive emergency exit plan for occupants to count on, when seconds count the most.

APPENDIX A

Figure 12:
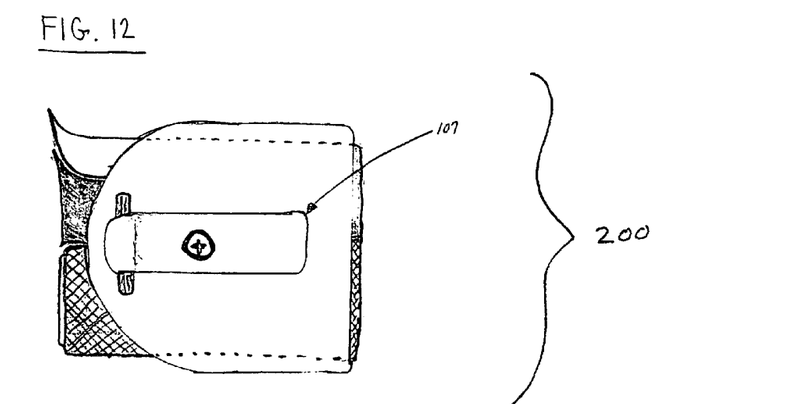
Figure 13:
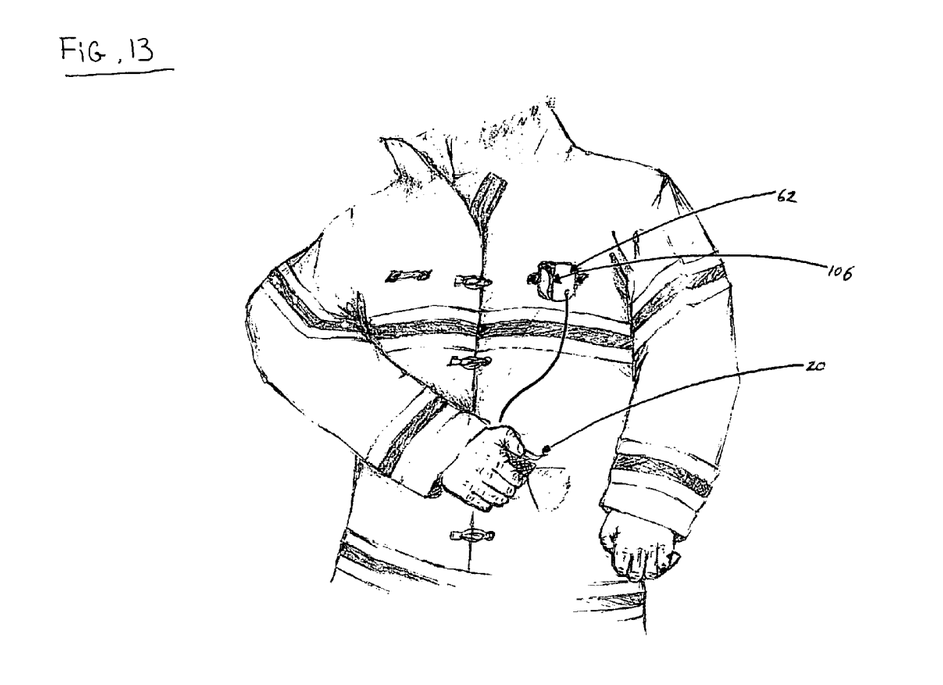

It is understood that the emergency self-evacuation system is primarily designed for an internal user to self evacuate, however, there is also a modified model that targets an external user such as an emergency provider or first responder to also apply the system. The First Responder model 200 of said system takes the Emergency Rescue Tool 20 attached to Emergency Rescue Cord 61 and Cord Reel Housing 62 fully intact and therefore eliminates the need for the 2 part tray door storage housing 15. The anterior aspect of Cord Reel Housing 62 has already been modified with a male channel block 106 that allows Emergency Rescue Tool body 20 and more specifically Cutter/Channel 30 to lock onto said housing 62 via male ball notch 113 on fork 24 onto female recession 114 of channel block 106 (See FIG. 3). In the standard model cutter/channel 30 is present but not utilized since tool 20 rests secured within the tray-door storage housing 15. In addition to the snug locking fit of Channel Block 106 into Cutter Channel 30 of Tool Body 20 onto Emergency Cord Housing 62, it also offers protection to the user from reducing exposure of Blade 32 within cutter channel 30 of tool 20. An additional modification to the rear or dorsal side of Cord Housing 62 offers the versatility of open compression clip 107 in substitution for the standard adhesive mounting tape 68 in the standard model (see FIG. 12). Allowing the Emergency Cord Housing clip 107 to adhere to the belt loop of an EMT, police officer or Emergency Rescue Provider maximizes the versatility for an external application of the Emergency Evacuation System. The rotating positional adjustment feature to cord housing clip 107 allows the First Responder Tool base to sit vertically or horizontally. The purpose for a horizontal adjustment would customize the cord housing clip 107 to fit properly on the exterior bunker coat of a fire fighter's turnout gear (See FIG. 13). All models will have a Manual slide-lock 105 for the Universal LED/Audible Alarm On/Off Switch 44. This Manual Slide-lock 105 is designed to be used in the First Responder Model 200 since the constant downward pressure onto Universal Switch 44 is not initiated outside Safety Storage Cabinet 15 without direct depression of Interior Door Prong 71. (Reminder: Safety Storage Cabinet 15 does not exist in 1st Responder Model 200). The 1st Responder Model 200 does not feature Safety Storage Cabinet 15 with Interior Door Prong 71. In the First Responder mode of operation (see Appendix A) a user can simply depress the Universal LED/Audible Alarm On/Off Switch 44 to "OFF" so that the Manual Slide-lock 105 can maintain this position. In order to reactivate LED Light 40 and/or Audible Activation Chime 45, Manual Slide-lock 105 can be slid back to the "unlock" position allowing the Universal LED/Audible Activation On/Off Switch to again loose manual depression upon it thereby powering the restored electric to the emergency rescue tool 20.

It should be emphasized that the above-described embodiments of the present invention, particularly, any "preferred" embodiments, are merely possible examples of implementations merely set forth for a clear understanding of the principles of the invention. The overall Spirit of the instant invention is not only its disclosed form but also in all other conceivable embodiments thereof, is what I seek to protect. Many variations and modifications may be made to the above-described embodiment(s) of the invention without departing substantially from the spirit, scope and principles of the invention. All such modifications and variations are intended to be included herein within the scope of this disclosure and the instant invention and protected by the following claims.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

I claim:

1. An emergency self-evacuation system, comprising:
   A safety storage cabinet;
   Interior tool storage and support tray;
   An emergency rescue tool;
   Said emergency rescue tool removably insertable into said Interior tool storage and support tray;
   said Interior tool storage and support tray swingably mounted within said safety storage cabinet;
   permanent mounting for said safety storage cabinet attached to rear of same; and
   said permanent mounting adapted for mounting said emergency self evacuation system within an automotive vehicle in an area closest to an intended user.

2. The emergency self-evacuation system of claim 1 wherein said emergency rescue tool comprises a forked handle having a cutter blade mounted therebetween the forks of said forked handle.

3. The emergency self-evacuation system of claim 2 wherein said emergency rescue tool has a wide fork sufficient to prevent a user from cutting himself.

4. The emergency self-evacuation system of claim 2 wherein said tip of said fork has a tip blade and switch to move said tip blade into and outward from said fork tip;
   and said tip blade is adapted to puncture, cut and deliver airbag material to said cutter blade via said fork.

5. The emergency self-evacuation system of claim 2 wherein said forked handle has a watertight compartment in a shaft of the body of said emergency rescue tool;
   and said watertight compartment also has at least one of a battery, a sound generator and a universal on/off switch with a light.

6. The emergency self-evacuation system of claim 1 wherein a universal on/off switch maintains said at least one of a light, battery and sound generator in the off, waiting position.

7. The emergency self-evacuation system of claim 6 wherein said universal on/off switch is released and automatically activates said at least one of a light, battery and sound generator in said emergency rescue tool when a hinged door of said safety storage cabinet opens.

8. The emergency self-evacuation system of claim 1 wherein said safety storage cabinet has a hinged door operable by a compressive force from a user.

9. The emergency self-evacuation system of claim 1 wherein said emergency rescue tool has at least one of a glass breaking component, a cord attachment, a cord and reel system, a manual cord retrieval push button for reeling said cord onto said reel system located within said safety storage cabinet and a blade for puncturing and cutting deployed airbags.

10. The emergency self-evacuation system of claim 9 wherein a spool stopper knot secures said cord in said cord attachment with an additional stopper knot securing said cord to said emergency rescue tool.

11. The emergency self-evacuation system of claim 9 wherein said cord has properties of at least one of buoyancy and glow and heat resistance.

12. The emergency self-evacuation system of claim 9 wherein said emergency self evacuation system is adapted for no automatic retrieval tension on the emergency cord.

13. The emergency self-evacuation system of claim 1 wherein said swingably mounted interior tool and storage tray drops down to deliver at least one of said emergency rescue tool within range of reach of a user and when a door on said safety storage cabinet is opened,
said door of said safety storage cabinet activates a call to at least one of an emergency dispatch center, a monitoring service establishment, and a monitoring dispatch center known as OnStar™ when opened by a user.

14. The emergency self-evacuation system of claim 1 wherein said emergency self evacuation system utilizes at least one of an automatic muscle mental memory activity to enhance safety, a one-step method of activation, a one-move methodology, an adaptation for a user to perform all operations with one hand, a foam packed into the handle of said emergency rescue tool to ensure floatation, and an anti-slippage surface located upon the surface of said emergency rescue tool.

15. The emergency self-evacuation system of claim 1 wherein said emergency self-evacuation system has an all-bases-covered plan for occupant safety in a vehicle.

16. The emergency self-evacuation system of claim 1 wherein said emergency self-evacuation system has a first responder option.

17. The emergency self-evacuation system of claim 16 wherein said first responder option has at least one of a substantial clip, a lock to maintain on/off switch in off position, a manual slide lock, and enhanced blade protection.

18. An external emergency responder user model, comprising:
at least one of an emergency rescue tool;
an emergency rescue cord, an emergency rescue cord reel, an emergency rescue cord reel housing, an emergency rescue cord attached to said cord reel housing;
an emergency rescue cord housing clip, an emergency rescue cord housing clip attached to said cord reel housing and channel block on said cord reel housing to receive said emergency rescue tool;
wherein said external emergency responder user model can adhere to the belt loop of an emergency rescue provider via said emergency rescue cord housing clip.

19. The external emergency responder user model of claim 18 wherein a positional adjustment feature allows at least one of said model to sit vertically or horizontally and said vertical or horizontal alignment is positional on a variable axis.

20. The external emergency responder user model of claim 18 wherein a variable adjustment mechanism allows said model to fit properly on at least one of the exterior bunker coat of a fire fighter's gear, the belt loop of a responder's uniform, and an outer means of attachment to any layperson's clothing.

21. The external emergency responder user model of claim 18 wherein said model has at least one of a manual slide lock, a manual locking mechanism, and a locking means wherein said lock performs at least one of an activation, and maintain said emergency tool in an "OFF" position for at least one of an LED/Audible Alarm on/off switch, an LED light, an audible alarm, and a power switch.

22. The external emergency responder user model of claim 21 wherein at least one of said LED/Audible Alarm on/off switch, LED light, Audible alarm, and power switch is manually deposed to "Off" wherein said depression of said switch maintains at least one of said LED/Audible Alarm on/off switch, LED light, Audible alarm, and power switch in said "Off" position.

23. The external emergency responder user model of claim 22 wherein said on/off switch may be manually reactivated.

24. The external emergency responder user model of claim 18 wherein said model has at least one of a multi-position block, a multi-positional block having at least one of a female recession and male prominence to receive at least one of a female recession and male prominence located on said emergency rescue tool.

\* \* \* \* \*